United States Patent
Haataja

(10) Patent No.: US 6,635,208 B2
(45) Date of Patent: Oct. 21, 2003

(54) METHOD FOR FORMING NARROW CHANNELS IN A WOOD FLAKE ARTICLE

(75) Inventor: Bruce A. Haataja, Lake Linden, MI (US)

(73) Assignee: Strandwood Molding, Inc., Hancock, MI (US)

( * ) Notice: Subject to any disclaimer, the term of this patent is extended or adjusted under 35 U.S.C. 154(b) by 193 days.

(21) Appl. No.: 09/847,273

(22) Filed: May 2, 2001

(65) Prior Publication Data

US 2001/0055665 A1 Dec. 27, 2001

Related U.S. Application Data

(60) Provisional application No. 60/201,093, filed on May 2, 2000.

(51) Int. Cl.[7] .............................................. B29C 59/02
(52) U.S. Cl. ......................... 264/123; 264/119; 264/293
(58) Field of Search ................................ 264/109–128, 264/293

(56) References Cited

U.S. PATENT DOCUMENTS

| | | |
|---|---|---|
| 3,164,511 A | 1/1965 | Elmendorf |
| 3,238,281 A | 3/1966 | Kato |
| 4,131,705 A | 12/1978 | Kubinsky |
| 4,213,928 A | 7/1980 | Casselbrant |
| 4,241,133 A | 12/1980 | Lund et al. |
| 4,246,310 A | 1/1981 | Hunt et al. |
| 4,248,163 A | 2/1981 | Caughey et al. |
| 4,248,820 A | 2/1981 | Haataja |
| 4,337,710 A | 7/1982 | Haataja et al. |
| 4,384,019 A | 5/1983 | Haataja |
| 4,408,544 A | * 10/1983 | Haataja ..................... 108/53.3 |
| 4,440,708 A | 4/1984 | Haataja et al. |
| 4,469,216 A | 9/1984 | Haataja et al. |
| 4,790,966 A | 12/1988 | Sandberg et al. |
| 4,960,553 A | 10/1990 | DeBruine et al. |
| 5,002,713 A | * 3/1991 | Palardy et al. .............. 264/109 |

* cited by examiner

Primary Examiner—Stephen J. Lechert, Jr.
(74) Attorney, Agent, or Firm—Price, Heneveld, Cooper, DeWitt & Litton

(57) ABSTRACT

Method of production of molded wood strand products having relatively narrow projections, such as channels, by inserting binder coated implants into projection forming voids in the mold cavity used to form the product.

9 Claims, 2 Drawing Sheets

METHOD FOR FORMING NARROW CHANNELS IN A WOOD FLAKE ARTICLE

CROSS-REFERENCE TO RELATED APPLICATIONS

The present application claims priority to Provisional Application No. 60/201,093, filed on May 2, 2000 and entitled METHOD AND APPARATUS FOR FORMING NARROW CHANNELS IN A WOOD FLAKE ARTICLE, AND THE RESULTING ARTICLE.

BACKGROUND OF THE INVENTION

A. Field of the Invention

The present invention relates to the revolutionary wood flake molding technology invented by wood scientists at Michigan Technological University during the latter part of the 1970s.

B. Background of the Art

Wood flake molding, also referred to as wood strand molding, is a technique for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.030 inches; and an average width of 3 inches or less, most typically 0.25 to 1.0 inches, and never greater than the average length of the flakes. These flakes are sometimes referred to in the art as "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e., non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted mat is then covered with another metal tray, and the covered metal tray is used to carry the mat to a mold. (The terms "mold" and "die", as well as "mold die", are sometimes used interchangeably herein, reflecting the fact that "dies" are usually associated with stamping, and "molds" are associated with plastic molding, and molding of wood strands does not fit into either category.) The top metal tray is removed, and the bottom metal tray is then slid out from underneath the mat, to leave the loosely felted mat in position on the bottom half of the mold. The top half of the mold is then used to press the mat into the bottom half of the mold at a pressure of approximately 600 psi, and at an elevated temperature, to "set" (polymerize) the MDI binder, and to compress and adhere the compressed wood flakes into a final three-dimensional molded part. The excess perimeter of the loosely felted mat, that is, the portion extending beyond the mold cavity perimeter, is pinched off where the part defining the perimeter of the upper mold engages the part defining perimeter of the lower mold cavity. This is sometimes referred to as the pinch trim edge.

U.S. Pat. No. 4,440,708 and U.S. Pat. No. 4,469,216 disclose this technology. The drawings in U.S. Pat. No. 4,469,216 best illustrate the manner in which the wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence which hold them together in the loosely felted mat. The drawings of U.S. Pat. No. 4,440,708 best illustrate the manner in which a loosely felted mat is compressed by the mold halves into a three-dimensionally configured article (see FIGS. 2–7, for example).

This is a very unusual molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

One problem with this technology is the difficulty of molding parts having relatively narrow channels projecting from the part. It is difficult to force the wood flakes down into the narrow channels. Hence, parts having relatively narrow reinforcing ribs projecting from one side could not heretofore be made using this technology.

SUMMARY OF THE INVENTION

In the present invention, it has been surprisingly discovered that relatively narrow, channel shaped projections from a surface of a molded wood strand product can be formed effectively and efficiently during the molding process by placing at least one binder coated implant having sufficient length, width, and height, within a projection defining void in the mold cavity, followed by compressing the loosely felted wood flake mat into the mold cavity and curing the resulting composite part.

These and other features, advantages and objects of the present invention will be further understood and appreciated by those skilled in the art by reference to the following specification and claims. A more detailed description of the present invention shall be discussed further below.

DETAILED DESCRIPTION OF THE PREFERRED EMBODIMENTS

Figure 1:
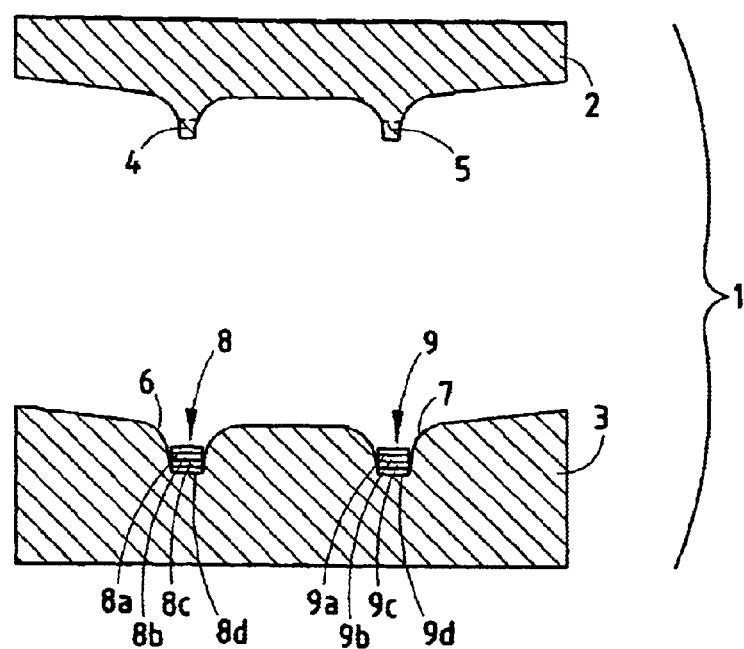
FIG. 1 is an elevational cross-sectional view of spaced upper and lower mold halves made in accordance with a preferred embodiment of the present invention, with implants in place in the bottom mold.

In a preferred embodiment, the molding apparatus 1 of the present invention comprises a top platen mold 2 having projections 4 and 5 and bottom mold die 3 having projection defining channels 6 and 7 (FIG. 1). Both top mold die 2 and bottom mold die 3 are capable of being heated and pressed together during the molding process. Within channels 6 and 7 are placed binder coated implants 8 and 9, which have a sufficient length, a sufficient width, and a sufficient height to substantially fill channels 6 and 7 (FIG. 1). One may optionally place a layer of flakes in the bottom of channels 6 and 7 before inserting the binder coated implants.

Figure 2:
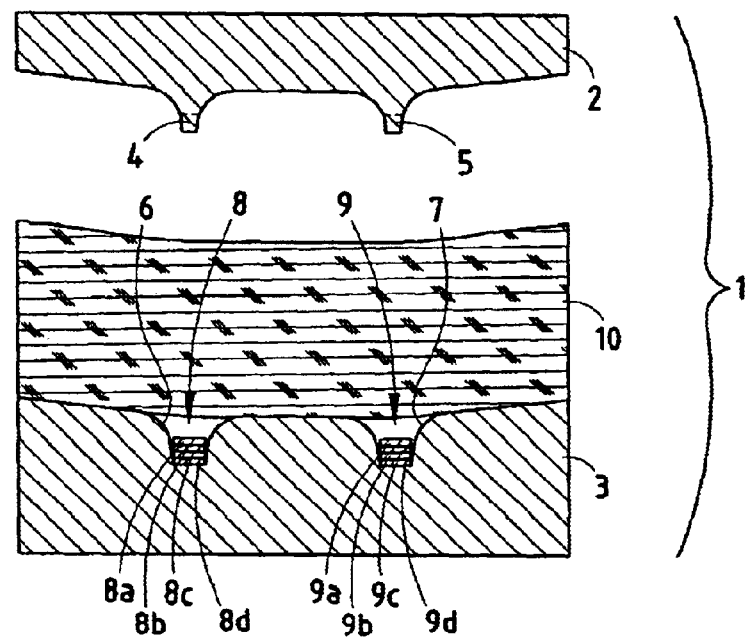
FIG. 2 is the same view as FIG. 1, with a loosely felted mat of wood flakes in place on the bottom mold.
Figure 3:
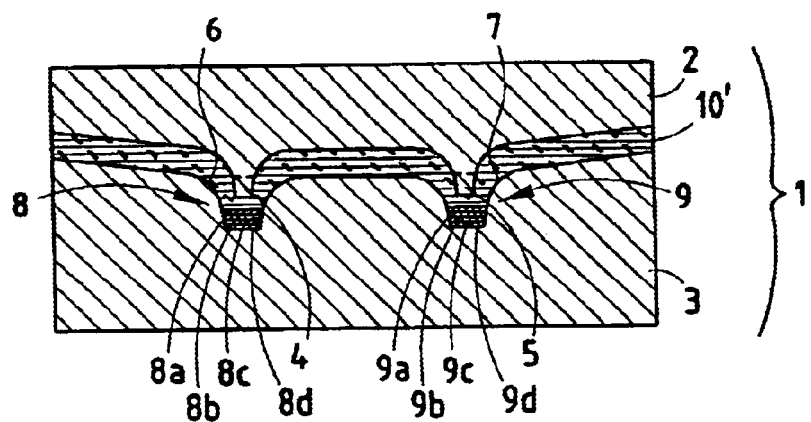
FIG. 3 is the same view as FIG. 2, but with the mold halves closed.
Figure 4:
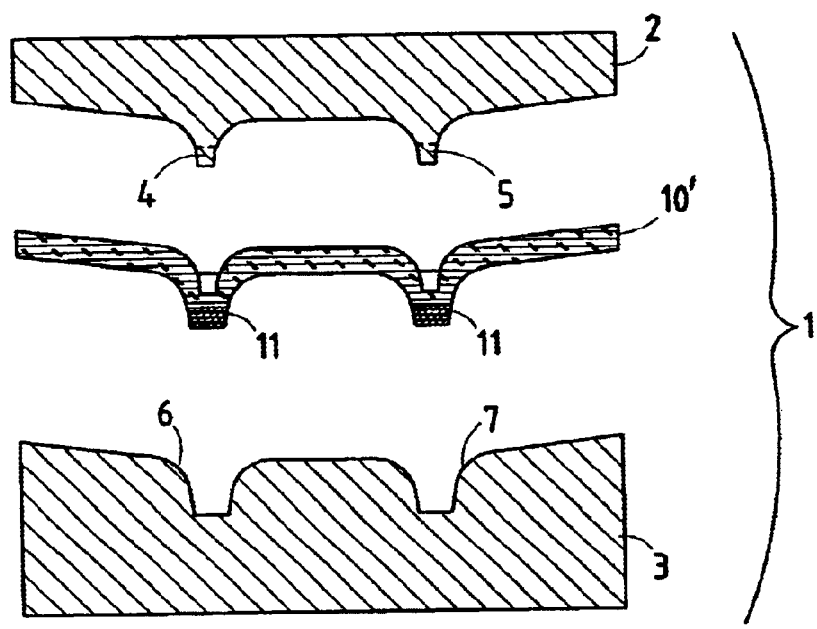
FIG. 4 is the same view as FIG. 3, but with the mold reopened and the part removed.

With implants 8 and 9 in place within channels 6 and 7, a loosely felted mat 10 of binder coated wood flakes is placed on the top of bottom mold 3 (FIG. 2). Mold halves 2 and 3 are then closed on mat 10 and implants 8 and 9, to heat and cure resulting part 10 in the mold (FIG. 3). Mold projections 4 and 5 help force binder coated wood flakes down into channels 6 and 7, on top of implants 8 and 9. After curing, mold halves 2 and 3 are opened, to facilitate removal of formed part 10' having relatively narrow ribs 11 projecting from one surface thereof (FIG. 4). Implants 8 and 9 are preferably binder coated pieces of wood, and more preferably comprise a plurality of relatively thin binder coated strips of veneer 8a–8d and 9a–9d. When the binder is cured, these stacks of thin veneer strips form a strength enhancing laminate.

The dimensions for the relatively narrow or small projection from the part to be formed, for which the use of implants is desirable can vary considerably as a function of part design. For example, ribs 11 on part 10' have a thickness of about 0.50 inches, a height of about 0.80 inches, and a length of about 8 inches. Where deeper projections are required, implants will be useful even in wider channels or other projections, e.g. as wide as 1.5 inches. Where two projections are close together, e.g., adjacent ribs, implants may be required for wider and even shallower ribs, because the rib forming channels in the mold must compete with each other for binder coated wood flakes from mat 10.

The wood flakes used can be prepared from various species of suitable hardwoods and softwoods used in the manufacture of particleboard. Representative examples of suitable woods include aspen, maple, oak, elm, balsam fir, pine, cedar, spruce, locust, beech, birch and mixtures thereof. Aspen is preferred.

Suitable wood flakes can be prepared by various conventional techniques. Pulpwood grade logs, or so-called round wood, are converted into flakes in one operation with a conventional roundwood flaker. Logging residue or the total tree is first cut into fingerlings in the order of 2–6 inches long with a conventional device, such as the helical comminuting shear disclosed in U.S. Pat. No. 4,053,004, and the fingerlings are flaked in a conventional ring-type flaker.

Roundwood flakes generally are higher quality and produce stronger parts because the lengths and thickness can be more accurately controlled. Also, roundwood flakes tend to be somewhat flatter, which facilitates more efficient blending and the logs can be debarked prior to flaking which reduces the amount of less desirable fines produced during flaking and handling. Acceptable flakes can be prepared by ring flaking fingerlings and this technique is more readily adaptable to accept wood in poorer form, thereby permitting more complete utilization of certain types of residue and surplus woods.

Irrespective of the particular technique employed for preparing the flakes, the size distribution of the flakes is quite important, particularly the length and thickness. The wood flakes should have an average length of about 1¼ inch to about 6 inches and an average thickness of about 0.005 to about 0.075. The average length of the wood flakes is preferably about 2 to about 3 inches. In any given batch, some of the flakes can be shorter than 1¼ inch, and some can be longer than 6 inches, so long as the overall average length is within the above range. The same is true for the thickness.

The presence of major quantities of flakes having a length shorter than about 1¼ inch tends to cause the mat to pull apart as the leg members are being drawn therefrom during the molding step. The presence of some fines in the mat produces a smoother surface and, thus, may be desirable for some applications so long as the majority of the wood flakes, preferably at least 75%, is longer than 1⅛ inch and the overall average length is at least 1¼ inch.

Substantial quantities of flakes having a thickness of less than about 0.005 should be avoided, because excessive amounts of binder are required to obtain adequate bonding. On the other hand, flakes having a thickness greater than about 0.075 inch are relatively stiff and tend to overlie each other at some incline when formed into the mat. Consequently, excessively high mold pressures are required to compress the flakes into the desired intimate contact with each other. For flakes having a thickness falling within the above range, thinner ones produce a smoother surface while thick ones require less binder. These two factors are balanced against each other for selecting the best average thickness for any particular application. The average thickness of the flakes preferably is about 0.015 to about 0.25 inch, and more preferably about 0.0020 inch.

The width of the flakes is less important. The flakes should be wide enough to ensure that they lie substantially flat when felted during mat formation. The average width generally should be about 3 inches or less and no greater than the average length. For best results, the majority of the flakes should have a width of about ¹⁄₁₆ inch to about 3 inches, and preferably 0.25 to 1.0 inches.

The blade setting on the flaker can primarily control the thickness of the flakes. The length and width of the flakes are also controlled to a large degree by the flaking operation. For example, when the flakes are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure the average length, thickness and width of the flakes are within the desired ranges. When roundwood flaking is used, both screen and air classification usually are required to adequately remove both the undersize and oversize particles, whereas fingerling flakes usually can be properly sized with only screen classification.

Flakes from some green wood can contain up to 90% moisture. The moisture content of the mat must be substantially less for molding as discussed below. Also, wet flakes tend to stick together and complicate classification and handling prior to blending. Accordingly, the flakes are preferably dried prior to classification in a conventional type drier, such as a tunnel drier, to the moisture content desired for the blending step. The moisture content to which the flakes are dried usually is in the order of about 6 weight % or less, preferably about 2 to about 5 weight %, based on the dry weight of the flakes. If desired, the flakes can be dried to a moisture content in the order of 10 to 25 weight % prior to classification and then dried to the desired moisture content for blending after classification. This two-step drying may reduce the overall energy requirements for drying flakes prepared from green woods in a manner producing substantial quantities of particles which must be removed during classification and, thus, need not be as thoroughly dried.

To coat the wood flakes prior to being placed as a felted mat 19 within the cavity of bottom mold die 3 within mold apparatus 10 of the preferred embodiment, a known amount of the dried, classified flakes is introduced into a conventional blender, such as a paddle-type batch blender, wherein predetermined amounts of a resinous particle binder, and optionally a wax and other additives, is applied to the flakes as they are tumbled or agitated in the blender. Suitable binders include those used in the manufacture of particleboard and similar pressed fibrous products and, thus, are badly referred to herein as "resinous particle board binders." Representative examples of suitable binders include thermosetting resins such as phenolformaldehyde, resorcinol-formaldehyde, melanfine-formaldehyde, urea-formaldehyde, urea-flirfuryl and condensed furfuryl alcohol resins, and organic polyisocyantes, either alone or combined with urea- or melamine-formaldehyde resins.

Particularly suitable polyisocyanates are those containing at least two active isocyanate groups per molecule, including diphenylmethane diisocyanates, m- and p-phenylene diisocyanates, chlorophenylen diisocyanates, toluene di- and triisocyanates, tyiphenylmethene triisocyanates, diphenylether-2,4,4'-triisoccyanate and polyphenylpolyisocyanates, particularly diphenylmethane-4,4'-diisocyanate. So-called MDI is particularly preferred.

The amount of binder added to the flakes during the blending step depends primarily upon the specific binder used, size, moisture content and type of the flakes, and the desired characteristics of the part being formed. Generally, the amount of binder added to the flakes is about 2 to about 15 weight %, preferably about 4 to about 10 weight %, as solids based on the dry weight of the flakes. When a polyisocyanate is used alone or in combination with a urea-formaldehyde resin, the amounts can be more toward the lower ends of these ranges.

The binder can be admixed with the flakes in either dry or liquid form. To maximize coverage of the flakes, the binder preferably is applied by spraying droplets of the binder in liquid form onto the flakes as they are being tumbled or agitated in the blender. When polyisocyantes are used, a conventional mold release agent preferably is applied to the die or to the surface of the felted mat prior to pressing. To improve water resistance of the part, a conventional liquid wax emulsion preferably is also sprayed on the flakes during the blinding step. The amount of wax added generally is about 0.5 to about 2 weight %, as solids based on the dry weight of the flakes. Other additives, such as a coloring agent fire retardant, insecticide, fungicide and the like may also be added to the flakes during the blending step. The binder, wax and other additives, can be added separately in any sequence or in combined form.

The moistened mixture of binder, wax and flakes or "furnish" from the blending step is formed into a loosely-felted, layered mat 10, which is placed within the cavity of bottom mold die 3 prior to the molding and curing of the mat into a molded wood particle product. The moisture content of the flakes should be controlled within certain limits so as to obtain adequate coating by the binder during the blending step and to enhance binder curing and deformation of the flakes during molding.

The presence of moisture in the flakes facilitates their bending to make intimate contact with each other and enhances uniform heat transfer throughout the mat 10 during the molding step, thereby ensuring uniform curing. However, excessive amounts of water tend to degrade some binders, particularly urea-formaldehyde resins, and generate steam which can cause blisters. On the other hand, if the flakes are too dry, they tend to absorb excessive amounts of the binder, leaving an insufficient amount on the surface to obtain good bonding and the surfaces tend to cause harden which inhibits the desired chemical reaction between the binder and cellulose in the wood. This latter condition is particularly true for polyisocyanate binders.

Generally, the moisture content of the furnish after completion of blending, including the original moisture content of the flakes and the moisture added during blending with the binder, wax and other additives, should be about 5 to about 25 weight %, preferably about 8 to about 12 weight %. Generally, higher moisture contents within these ranges can be used for polyisocyanate binders because they do not produce condensation products upon reacting with cellulose in the wood.

The furnish is formed into a generally flat, loosely-felted, mat, preferably as multiple layers. A conventional dispensing system, similar to those disclosed in U.S. Pat. Nos. 3,391,223 and 3,824,058, and 4,469,216 can be used to form the mat. Generally, such a dispensing system includes trays, each having one open side, carried on an endless belt or conveyor and one or more (e.g., 3) hoppers spaced above and along the belt in the direction of travel for receiving the furnish.

When a multi-layered mat is formed in accordance with a preferred embodiment, a plurality of hoppers usually are used with each having a dispensing or forming head extending across the width of the carriage for successively depositing a separate layer of the furnish as the tray is moved beneath the forming heads. Following this, the tray is taken to the mold to place the felted mat 10 within the cavity of bottom mold die 3, by sliding the tray out from under mat 10.

In order to produce molded wood strand products having the desired edge density characteristics without excessive blistering and springback, the felted mat 10 should preferably have a substantially uniform thickness and the flakes should lie substantially flat in a horizontal plane parallel to the surface of the carriage and be randomly oriented relative to each other in that plane. The uniformity of the mat thickness can be controlled by depositing two or more layers of the furnish on the carriage and metering the flow of furnish from the forming heads.

Spacing the forming heads above the carriage so the flakes must drop about 1 to about 3 feet from the heads en route to the carriage can enhance the desired random orientation of the flakes. As the flat flakes fall from that height, they tend to spiral downwardly and land generally flat in a random pattern. Wider flakes with the range discussed above enhance this action. A scalper or similar device spaced above the carriage can be used to ensure uniform thickness or depth of the mat, however, such means usually tends to align the top layer of flakes, i.e., eliminate the desired random orientation. Accordingly, the thickness of the mat preferably is controlled by closely metering the flow of furnish from the forming heads.

The mat thickness used will vary depending upon such factors as the size and shape of the wood flakes, the particular technique used for forming the mat, the desired thickness and density of the mold wood product produced, the configuration of the molded wood product, and the molding pressure to be used.

Following the production and placement of the veneer implant strips 8a–8d and 9a–9d, and of felted mat 10 over the cavity of bottom platen die 3, the felted mat 10 is compressed between top die 2 and bottom die 3. During this time of engagement between the two dies, projections 4 and 5 help force binder coated wood flakes down into channels 6 and 7 onto implants 8 and 9 (FIG. 3).

After felted mat 10 and implants 8 and 9 have been sufficiently compressed and cured, molded wood part 10' is formed having ribs 11 formed by implants 8 and 9. Once molded wood part 10' is formed, it is removed from between molding apparatus 1 (FIG. 4).

The above description is that of the preferred embodiments only. Modifications of the invention will occur to those skilled in the art and to those who make or use the invention. Therefore, it is understood that the embodiment described above is merely for illustrative purposes and not intended to limit the scope of the invention, which is defined by the following claims as interpreted according to the principles of patent law, including the Doctrine of Equivalents.

The claimed invention is:

1. A method of molding a three dimensionally curved article formed from binder coated wood flakes, said article having at least one relatively narrow, channel-shaped projection projecting from its surface, comprising:

providing upper and lower mold dies, one of said dies having at least one relatively narrow channel defined therein, for forming a relatively narrow channel-shaped projection in said article;

placing within said relatively narrow channel at least one binder coated implant having sufficient length, width, and height to substantially fill said narrow channel;

forming a loosely felted mat of said wood flakes;

depositing said mat onto said lower mold die;

compressing and heating said mat between said upper mold die and said lower mold die to form said article to help force binder coated wood flakes down into said channel and onto said implant, and bind said flakes to said implant.

2. The method of claim 1 wherein said binder coated implant comprises a relatively thin strip of veneer, coated with a binder.

3. The method of claim 2 in which a stack of a plurality of said thin, binder coated strips of veneer are placed in said relatively narrow channel in said one of said mold dies.

4. The method of claim 3 wherein said channel has a width of from about 0.50 inches to about 1.5 inches.

5. The method of claim 2 wherein said channel has a width of from about 0.50 inches to about 1.5 inches.

6. The method of claim 1, 2 or 3 wherein said wood flakes have an average length of from about 1¼ to about 6.0 inches, an average thickness of from about 0.015 to about 0.25 inches, and an average width of less than the average length, and no greater than about 3.0 inches.

7. The method of claim 6, wherein said wood flakes of said mat have an average length of from about 2 to about 3 inches.

8. The method of claim 7, wherein said wood flakes of said mat have an average thickness of from about 0.015 to about 0.025 inches.

9. The method of claim 8, wherein said wood flakes of said mat have an average width of from about 0.25 to about 1.0 inches.

* * * * *